US 6,629,153 B1
Sep. 30, 2003

(54) METHOD AND APPARATUS FOR PROVIDING PEER OWNERSHIP OF SHARED OBJECTS

(75) Inventors: Neeraj Gupta, Austin, TX (US); Andrew Price, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 0 days.

(21) Appl. No.: 08/931,878

(22) Filed: Sep. 17, 1997

(51) Int. Cl.⁷ .............................................. G06F 9/00
(52) U.S. Cl. ...................................................... 709/316
(58) Field of Search ............................. 709/310, 312, 709/316; 707/103 R

(56) References Cited

U.S. PATENT DOCUMENTS

| | | | | |
|---|---|---|---|---|
| 4,660,142 A | * | 4/1987 | Clancy et al. ............... | 711/202 |
| 5,446,901 A | * | 8/1995 | Owicki et al. ............... | 711/154 |
| 5,615,362 A | * | 3/1997 | Jensen et al. ............... | 707/103 |
| 5,765,174 A | * | 6/1998 | Bishop ....................... | 707/206 |
| 5,802,367 A | * | 9/1998 | Held et al. .................. | 709/305 |
| 5,884,316 A | * | 3/1999 | Bernstein et al. ........... | 707/103 |
| 5,991,823 A | * | 11/1999 | Cavanaugh, III et al. ... | 709/304 |

OTHER PUBLICATIONS

"Strategies for Sharing Objects in Distributed Systems" Daniels et al., Jan. 1993.*
"performance of firefly rpc", DEC, michael schroeder, Apr. 1989.*
OLE 2.01 Design Specification, Microsoft OLE2 Design Team, Microsoft Corporation, pp. 61–73, 99–100, and 185–200.
Bal, H.E., Tannenbaum, A.S., Distributed Programming with Shared Data, Computer Languages, vol. 16, pp., Feb. 1991.
"OLE Q & A" by Don Box, *MicroSoft Systems Journal*, Feb., 1996, vol. 11, No. 2, pp. 99–106.

\* cited by examiner

*Primary Examiner*—John Follansbee
*Assistant Examiner*—George L. Opie

(57) ABSTRACT

A method and apparatus for providing peer ownership of shared objects. In the invention, shared objects are implemented as a shell object with shared object state stored in shared memory. Each process that shares the object is granted a shell object within their process space which points to the object state in shared memory. All processes share equal access to the shared object, with no single process determining the lifetime of the shared object. The shutdown of any single process results in the termination of that process's respective shell object, without the necessary termination of the shared object state in shared memory. There is therefore no shutdown problem. Further, performance is enhanced because all processes access the shared object state in shared memory in what is essentially an in-process call. In an embodiment of the invention, a peer ownership manager acts as the object server for all shared objects whose object state resides in shared memory. A global table is maintained within the peer ownership manager which contains the shared memory offset location of each object's state referenced by the GID (global identifier number) of the object. Also, for each process, a shell table is maintained in which existing shell objects for a given process are referenced by the offset value for the object's state in shared memory. Methods are provided for supporting object webs in shared memory, and for putting dynamically sized data and standard non-peer objects into shared objects in shared memory.

29 Claims, 10 Drawing Sheets

METHOD AND APPARATUS FOR PROVIDING PEER OWNERSHIP OF SHARED OBJECTS

BACKGROUND OF THE INVENTION

1. Field of the Invention

This invention relates to the field of computer-related systems, and more particularly to shared objects in an object-oriented environment.

2. Background Art

In the development of software applications, it is becoming more common for separate applications to interact with each other such that data processed in one application is accessed from another application as well, and possibly further processed. The utility of each application is increased by its inclusion in a suite of related applications that each provide some function with respect to the common data. Mechanisms exist for sharing data by encapsulating the data in objects which are shared among the applications. One application creates the object, and then other applications are able to obtain a reference to the object and share its data via the methods or interfaces provided by the shared object.

However, each shared object is owned by the host application that created it. This means that the shared object resides within the host application, and that, when the host application shuts down, all of its associated shared objects are terminated, depriving all other applications of access to the shared data. Also, all applications access the shared object indirectly via the host application. This indirect access of the shared object is many times slower, and much more expensive in processor resources, than direct access to the object. There is therefore a shutdown problem and a performance problem inherent in this mechanism for sharing objects between applications. To better illustrate the problems associated with sharing objects, description is given below with respect to application process spaces and one software technology which facilitates the sharing of objects, the object linking and embedding (OLE) technology from Microsoft Corporation, built upon the component object model (COM).

Application Process Spaces and OLE/COM

Each application or process has its own assigned "process space" comprised of logical addresses. Each process is assigned random access memory (RAM) comprising those locations in random access memory that are accessible to the given process (i.e., address space). Logical addresses in each process space are mapped to actual physical addresses of random-access memory independently of any other process space. For example, logical (or process) addresses 0–1800 for process space A. may be mapped to physical addresses 700–2500, whereas logical addresses 0–1800 of process space B may be mapped to physical addresses 2501–2801 and 3000–4500. A logical address of 300 within process space A maps to a completely different and independent location in RAM than the same logical address within process space B.

Operations or function calls which occur within a single process are commonly referred to as "in-process" calls, whereas function calls which involve crossing the process boundary to be completed in a separate process space are commonly referred to as "cross-process" calls. The OLE/COM system typically manages cross-process calls by marshalling the calls using an LRPC (lightweight remote procedure call) packet mechanism.

When a client process issues a cross-process function call directed to a server process across a process boundary, the remoting code of the OLE/COM system (e.g., an object proxy) marshals the function call on the client side, including generation of a marshal packet. The system processor then performs a context switch to transfer operation from the client process to the server process. On the server side, further code for remoting the function call (e.g., stub code) unmarshals the marshal packet and initiates the function call in the server process. Any returned response from the server process is similarly marshalled back to the client process with the associated context switch from server process to client process.

In contrast, in-process function calls are processed directly, without the need for marshalling or context switching. As a result, cross-process function calls may be up to 1000 times slower than in-process function calls. Unfortunately, the sharing of objects in the OLE/COM system is strongly dependent on cross-process function calls.

FIG. 1A illustrates the system structure of an OLE/COM system. System hardware 106, such as a personal computer, is used to execute and support an operating system 105, such as the windows NT or other available operating systems. The OLE 103 and COM 104 software subsystems execute on top of the operating system and form a platform for the creation, management and interaction of OLE/COM objects. Processes 100–102 operate on top of this OLE/COM platform.

The OLE/COM system includes an API (application programming interface) supporting calls for services such as standard marshalling, and proxy/stub pair remoting code defined using IDL (interface definition language) is maintained to service standard marshalling calls. The OLE/COM system includes an object server registry for locating an appropriate object server for a given object class ID. Information regarding what methods an interface supports, and the types of parameters required by each method, may be obtained from a type library.

OLE/COM objects comprise one or more interfaces by which object methods may be invoked. Each interface represents a contract between the client accessing the interface and the object serving the interface. Every OLE/COM object includes the IUnknown interface, which, when queried, provides information about the other interfaces supported by the respective object. The interfaces of an OLE/COM object are identified by pointers in a pointer table. These pointers have meaning only within the process space in which the object is created, or instantiated.

Object data is encapsulated within the object and is accessed via the supported interfaces. One piece of data that exists within each OLE/COM object is a reference count. The reference count is incremented for every new reference to the object, and decremented when a reference is no longer in use. The object can be terminated and its resources released when the reference count is at zero, or when the host process itself terminates. Objects may be created by class factories of an object server resident within a process space or an object server resident within a dynamic linked library (DLL) appended to a process space.

Cross-Process Object Sharing

Sharing dynamically created objects across multiple process spaces is a difficult problem to solve in a generic sense. OLE/COM supports the following object sharing mechanisms shown in FIGS. 2A–2C.

FIG. 2A illustrates two processes, process A and process B, residing in respective process spaces 200 and 201. Between process spaces 200 and 201 is a conceptual process boundary representing a separation between independent process spaces 200 and 201. Object 202 is instantiated within process A, with all associated pointers to interfaces defined with respect to process space 200. Process A is considered to "own" object 202, because object 202 exists only within the process in which it is instantiated. All calls on the interfaces of object 202 from process A are made as direct, in-process function calls.

However, if another process, process B, somehow acquires a reference to object 202, the OLE/COM system instantiates a proxy object 203 within process space 201 which presents all defined interfaces of object 202 to process B. Stub code 210 is activated within process A, and proxy object 203 is linked to the stub code. When process B initiates an in-process function call on proxy object 203, the function call is marshalled through the process boundary by remoting code in proxy object 203 using the standard OLE/COM cross-process marshaller. Stub code 210 unmarshals the function call within process A, and executes the function call in-process on object 202 in process space 200. Return values in process A from object 202 are marshalled back through the process boundary by the stub code and returned from proxy object 203 to process B. Other processes wishing to share object 202 are similarly granted proxy/stub pairs for interfacing with object 202 via cross-process calls. The OLE cross-process marshaller maintains at least one reference on the shared object for each additional process that has a reference to it.

FIG. 2B illustrates the sharing of an object in which the object is created by an object server in DLL (dynamic link library) 205 appended to process A. The DLL provides a convenient way to implement in-process servers as needed. The shared object within the DLL is accessed in-process by process A, and accessed cross-process by process B as outlined with respect to FIG. 2A.

The above OLE/COM mechanism for sharing objects suffers from both performance and correctness problems. With regard to performance, all cross-process calls are much slower than in-process calls. The slowness is due to the need to marshal the function call and perform context switching between processes. Unfortunately, all processes, except the process that owns the shared object, access the shared object cross-process.

With regard to correctness, there exists a problem in managing the shutdown of an application or process which owns a shared object. All processes which are accessing the shared object cross-process require that the process which created the shared object not terminate as long as the shared object is needed. It is left to the programmer of the source application to be aware of this shutdown problem and take steps accordingly. If the source application leverages an in-process object server (e.g., via a dynamic link library (DLL)) to create the objects, as shown in FIG. 2B, the objects are still accessible via cross-process calls through the source application. It is extremely difficult for the in-process server to keep the source application alive. The premature shutdown of a source application and its shared object can lead to data loss for other processes accessing the shared object.

One method for dealing with the shutdown problem is to have the original process determine when it cannot exit safely. The original process can then hide itself and stay running in the background. However, this is an unsatisfactory solution in terms of resources. For example, all resources, such as system memory, that are allocated to the original process may not be reclaimed until the original process exits. Further, another process may locate the hidden process, and attempt to reactivate the hidden process from an ill-defined state.

Another method for preventing premature shutdown of a shared object and its source process is to create a custom application communication protocol which enforces correct shutdown order. However, the use of a custom application protocol causes difficulty in a system that includes applications from multiple vendors, as it requires that each process have knowledge of every other process.

A third method for preventing premature shutdown of a source process and its shared object(s) is illustrated in FIG. 2C. All objects are created in a distinct process space 206 so that there is no application shutdown or communication issue. Objects 202 and 209 are instantiated within process space 206. Process A accesses the interfaces of object 209 via proxy object 207 and stub code 211. Process B accesses the interfaces of object 202 via proxy object 203 and stub code 210. Elements 204 and 208 represent the cross-process marshalling of function calls, for example via LRPC packets.

In FIG. 2C, process C acts as the object server for all shared objects. The shutdown of any process other than process C does not result in data loss for any other process, because all objects are owned by process C. Thus, process C can be maintained indefinitely to support the shared objects and alleviate the shutdown problem. The obvious disadvantage associated with the method of FIG. 2C is that all calls to the shared objects are performed as cross-process calls. Even in the common case where process A accesses what would normally be its own objects and no other processes share those objects, all process calls by process A that would previously have been made inprocess (e.g., under the mechanisms of FIGS. 2A–B) are now made crossprocess to process C under the mechanism of FIG. 2C. System performance is therefore extremely slow. No method exists for solving the shutdown problem without experiencing performance loss due to the expense of crossprocess calls.

SUMMARY OF THE INVENTION

The invention provides a method and apparatus for providing peer ownership of shared objects. In the invention, shared objects, or "peer" objects, are implemented as a shell object with shared object state stored in shared memory. Each process that shares the object is granted a shell object within their process space which points to the object state in shared memory. All processes share equal access to the shared object, with no single process determining the lifetime of the shared object. The shutdown of any single process results in the termination of that process's respective shell object, without the necessary termination of the shared object state in shared memory. There is therefore no shutdown problem. Further, performance is enhanced because all processes access the shared object state in shared memory in what is essentially an in-process call.

The shell object presents the interfaces of a given object, but maintains all object state in a data block in shared memory. A pointer is maintained in the shell object which points to the data block in shared memory, and all operations on the object state are performed in-process via this pointer. In one embodiment, the shell object also contains a reference count value controlled by the process containing the shell. When the reference count is zero, the shell object may be terminated. A separate reference count is maintained for the object state itself. The reference count of the object state is incremented for each shell object that points to it. When a shell object is terminated, the object state reference count is decremented by one. The object state in shared memory is only permitted to terminate when the object state reference count is zero, indicating that no corresponding shell objects remain in any process.

In an embodiment of the invention, a peer ownership manager acts as the object server for all shared objects whose object state resides in shared memory. The peer ownership manager may maintain the reference count for each object's object state in shared memory, or the reference count may be stored within the object state itself. A global table is maintained within the peer ownership manager which contains the shared memory offset location of each object's state referenced by the GID (global identifier number) of the object. For each process, a shell table is maintained in which existing shell objects for a given process are referenced by the offset value for the object's state in shared memory. The shared memory offset remains the same regardless of process space. When necessary, such as to set a shell pointer for the corresponding object state, the shared memory offset value is resolved into a pointer value for the respective process space. Methods are provided for supporting object webs in shared memory, and for putting dynamically sized data and standard non-peer objects into shared objects in shared memory.

DETAILED DESCRIPTION OF THE INVENTION

The invention is a method for providing peer ownership of shared objects. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Computer Hardware Embodiment

Figure 3:
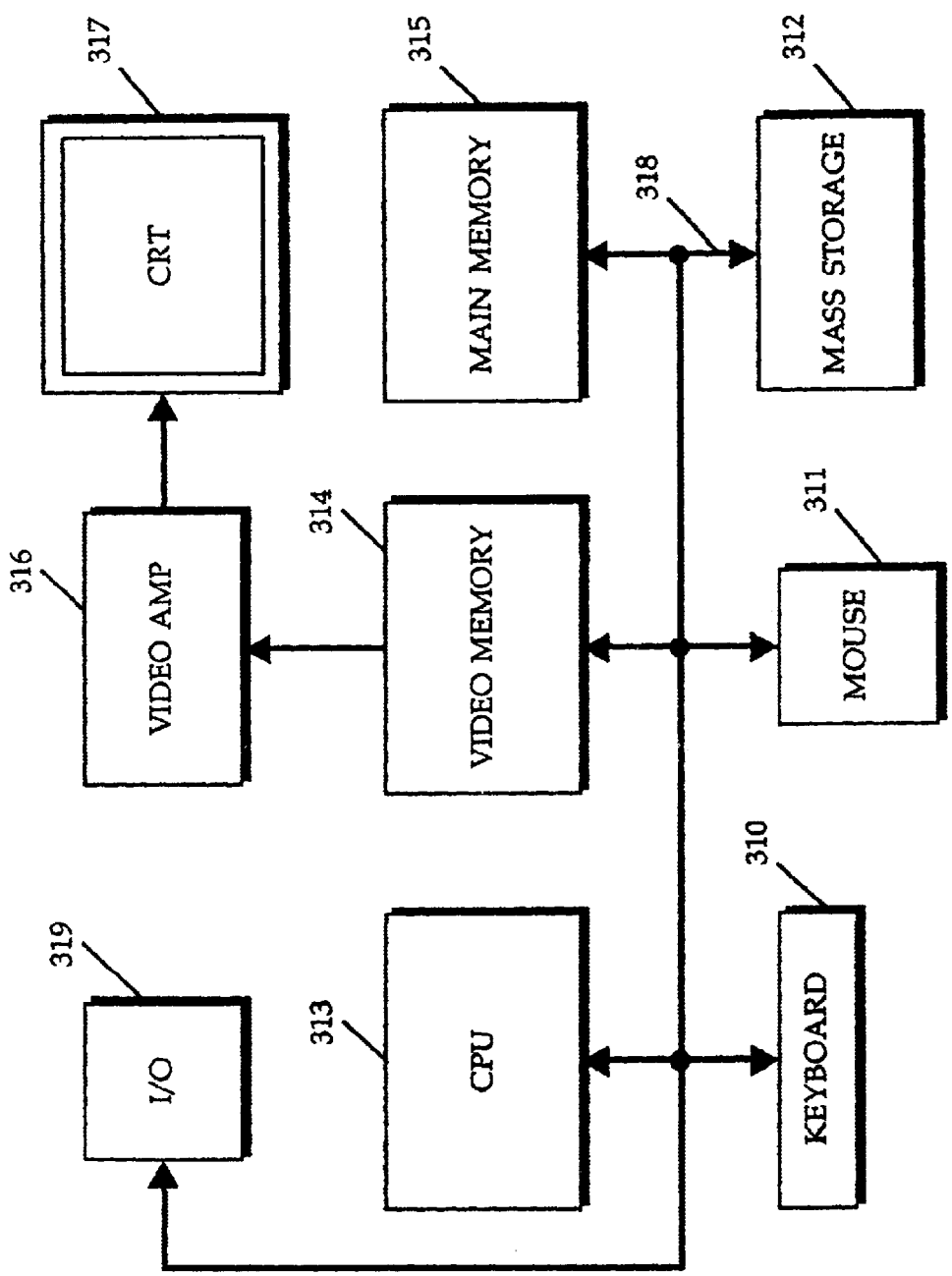
FIG. 3 is a general block diagram of a computer hardware system on which an embodiment of the invention may be executed.

An embodiment of the invention can be implemented as computer software in the form of computer readable program code executed on a general purpose computer such as illustrated in FIG. 3. A keyboard 310 and mouse 311 are coupled to a bi-directional system bus 318. The keyboard and mouse are for introducing user input to the computer system and communicating that user input to central processing unit (CPU) 313. Other suitable input devices may be used in addition to, or in place of, the mouse 311 and keyboard 310. I/O (input/output) unit 319 coupled to bi-directional system bus 318 represents such I/O elements as a printer, network communications card, modem, A/V (audio/video) I/O, etc.

The computer system of FIG. 3 also includes a video memory 314, main memory 315 and mass storage 312, all coupled to bi-directional system bus 318 along with keyboard 310, mouse 311 and CPU 313. The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 32-bit data bus for transferring data between and among the components, such as CPU 313, main memory 315, video memory 314 and mass storage 312. Alternatively, multiplex data/address lines may be used instead of separate data and address lines.

In one embodiment of the invention, the CPU 313 is a microprocessor manufactured by. Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Further, the apparatus may comprise a plurality of microprocessors in a multi-processing arrangement.

Main memory 315 is comprised of dynamic random access memory (DRAM). Video memory 314 is a dual-ported video random access memory. One port of the video memory 314 is. coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

The apparatus of FIG. 3 may be used as a stand-alone system, or the apparatus may be coupled to other similar apparatus across any type of network (e.g., LAN, WAN, PSTN, Internet, Cable TV, etc.), or any combination thereof.

The computer system described above is for purposes of example only. An embodiment of the invention may be implemented in any type of computer system or programming or processing environment.

Implementation of Peer Ownership

In an embodiment of the invention, shared objects are implemented as shell objects within each process that desires to share the object. Each shell object is an OLE/COM object that supports all interfaces of the shared object. However, only minimal object state is maintained within the shell object itself, that which the shell object needs for its own control and for accessing the main shared object state. This minimal state comprises the reference count governing the, lifetime of the shell object, and a pointer to where the main shared object state is stored as a data block in mapped shared memory, which is accessible by all processes. The main shared object state contains the object data that is desired to be shared among processes. Also, the shared object state has its own reference count which may be stored with the rest of the object state in shared memory, or may be maintained separately by the peer ownership manager, which will be discussed further below.

When a given process obtains a reference to the shared object, a shell object is created in the given process's process space for accessing the shared object state in shared memory. Each process thus may have its own shell object within its process space, but only one instance of the shared object state exists in shared memory. When a process no longer requires the services of a shared object, the respective shell object may terminate for that process, but the shared object state remains in shared memory for use by other processes. The shared object state does not terminate within shared memory unless all associated shell objects have been terminated, drawing the reference count of the shared object state to zero.

This method of sharing objects is referred to as "peer ownership" because all processes are given equivalent access to a shared object state with in-process calls, and all processes have equal ability to keep the shared object state alive through reference counting. Process shutdown order is no longer a factor in the operation of shared objects and the performance drawbacks of cross-process calls are obviated by the in-process access to shared memory.

An embodiment of the invention implements a peer ownership manager to manage the shared object state in shared memory, as well as each shell object. The peer ownership manager is able to maintain process independent location information regarding shared object state because of the mapping properties of mapped shared memory. The peer ownership manager manages shared object state globally across all process spaces, and resolves the process independent location information locally to handle individual shell objects within each process space.

Mapped shared memory is a block of random access memory that is mapped into each process space. Thus, each process may read and write in-process to shared object state in shared memory via the shell object. The shared memory is mapped as a contiguous block, but because each process space is mapped independently of every other process space, the block of shared memory may begin at a different address in each process space. The address of the beginning of the block of shared memory is referred to as the shared memory base address. Because shared memory is mapped as a contiguous block, the address for specific data within shared memory is always at the same location with respect to the shared memory base address, regardless of process space. This means that data in shared memory may be globally tracked by the offset from the shared memory base address. To resolve the local address for a given process space, the offset is added to the shared memory base address within the given process space.

To track the shared object state created within shared memory, an embodiment of the invention maintains a global map of the GID (global identifier) for each object and the corresponding offset for the location of the data block within shared memory which contains the shared object state. Another map is maintained for each process in which each offset value is associated with an active shell object that points to the data block with the given offset.

Figure 1A:
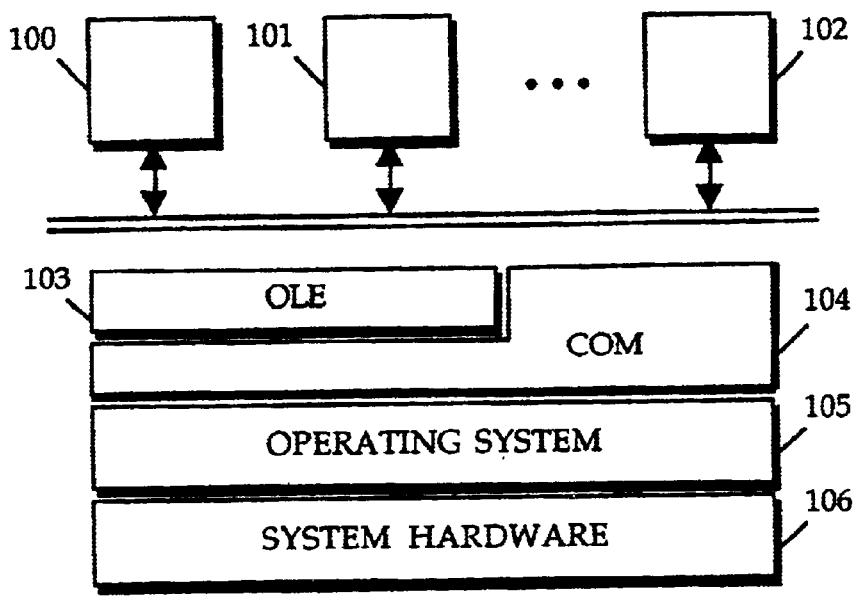
FIG. 1A is a block diagram illustrating the OLE/COM system architecture.
Figure 1B:
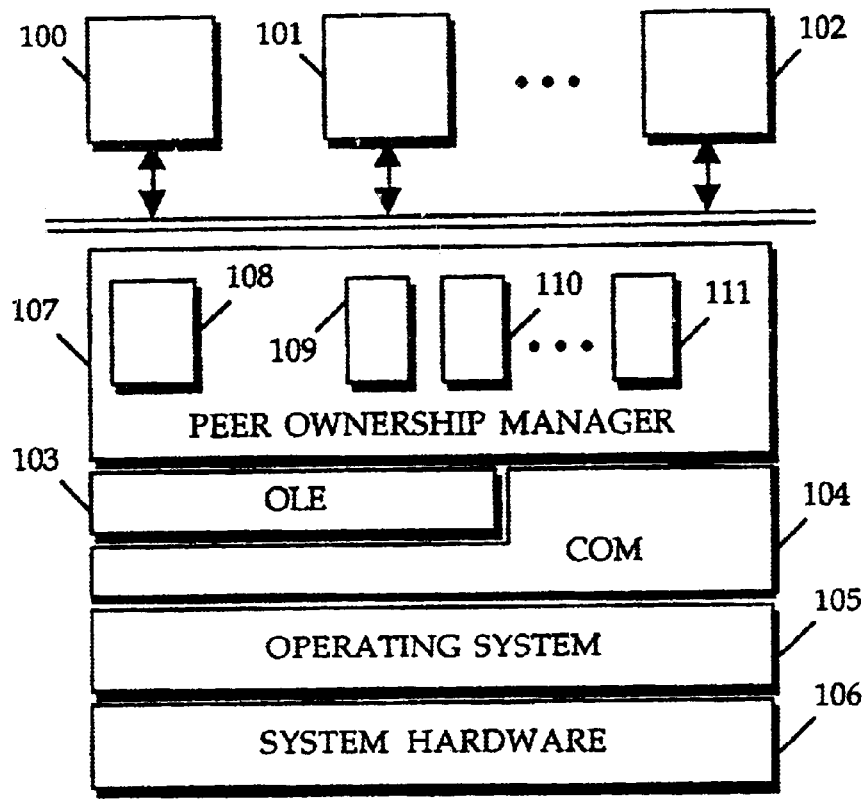
FIG. 1B is a block diagram of an OLE/COM system incorporating a peer ownership manager in accordance with an embodiment of the invention.
Figure 2A:
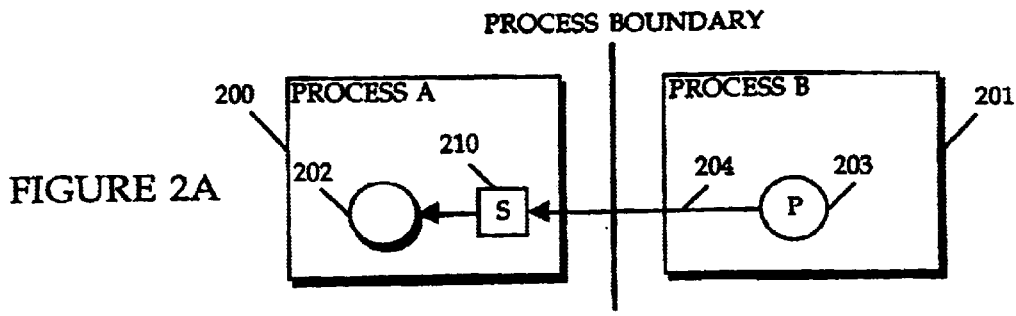
FIGS. 2A–C are block diagrams illustrating cross-process mechanisms for sharing objects between process spaces.
Figure 2B:
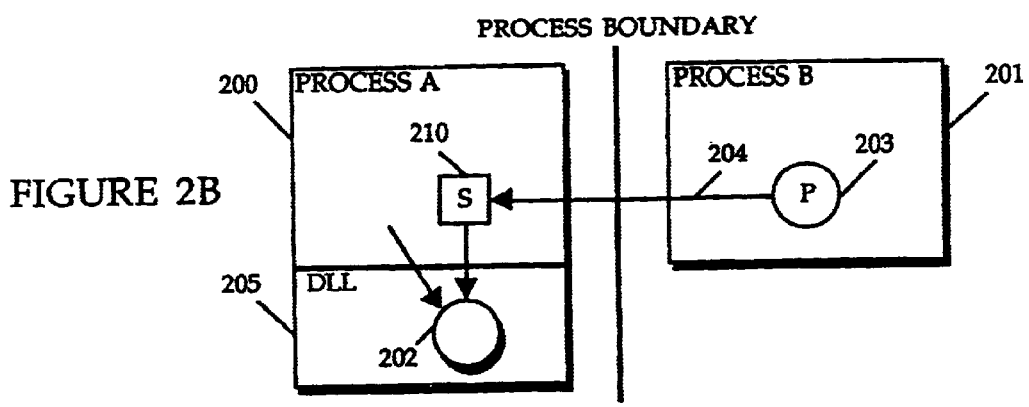
Figure 2C:
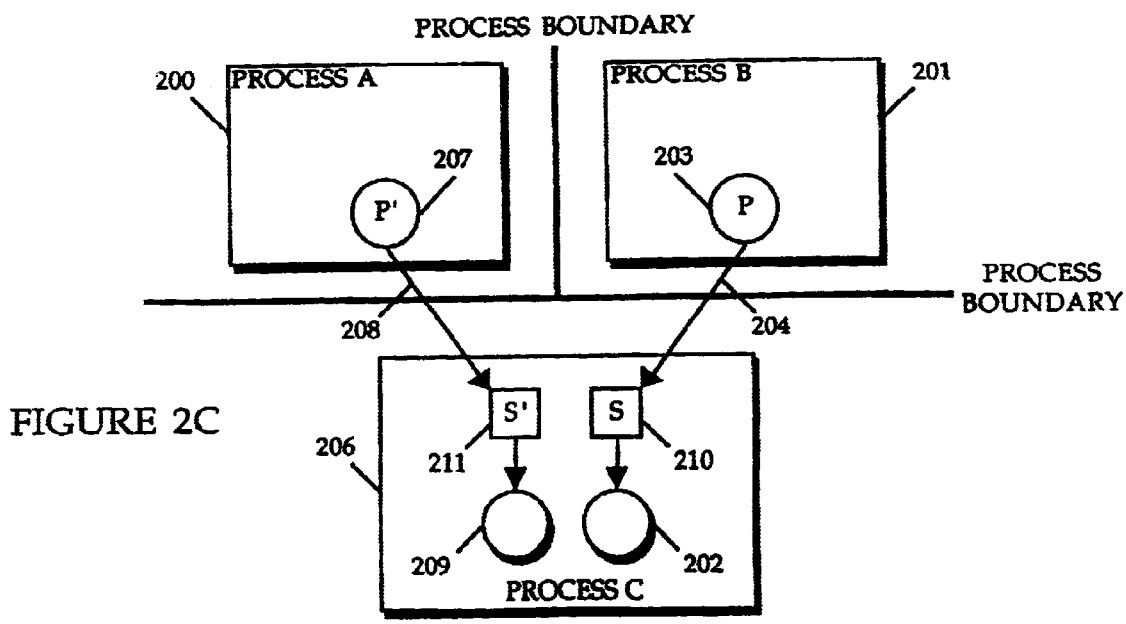

FIG. 1B is a block diagram illustrating an OLE/COM system further comprising peer ownership manager 107.

Peer ownership manager 107 contains global table 108 which maps object GIDs to shared memory offset values, and individual process tables 109–111 corresponding to processes 100–102, which contain mappings between shared memory offset values and respective shell objects for each process space. Peer ownership manager 107 provides for the creation, management and control of shared object state within shared memory and corresponding shell objects within each process space. The shared objects created by the peer ownership manager are referred to as "peer" objects, in contrast to "non-peer" objects created by a standard object server. The peer ownership manager presents an API upon which all processes may issue function calls. In some embodiments, the peer ownership manager is implemented as one or more objects in shared memory.

In one embodiment of the invention, control over shared memory is enforced such that the shared memory base address is the same for each process. In this case, because shared memory offset values are process-independent, actual pointer values for data in shared memory (i.e., shared memory base address+offset value) are also the same for each process. Therefore, the actual pointer values may be used instead of offset values to track the shared objects on a global basis. Thus, all references to offset values may be replaced by actual pointer values for this embodiment, and all steps described herein for resolving offset values into local pointers may be omitted.

For purposes of illustration, the following description is provided with respect to embodiments wherein the shared memory base address is permitted to differ between processes, and shell objects are utilized to contain local pointer values to shared object state in shared memory.

Figure 4:
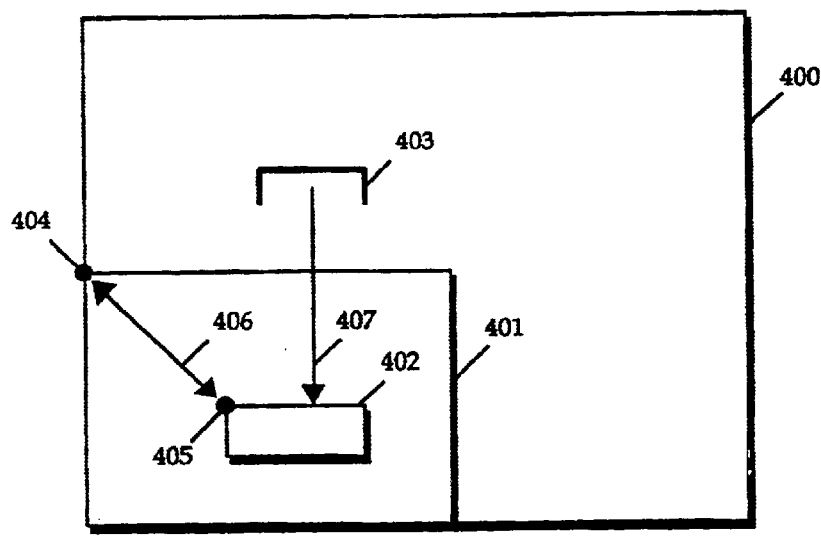
FIG. 4 is a block diagram of a shell object pointing to an object in shared memory in accordance with an embodiment of the invention.
Figure 5:
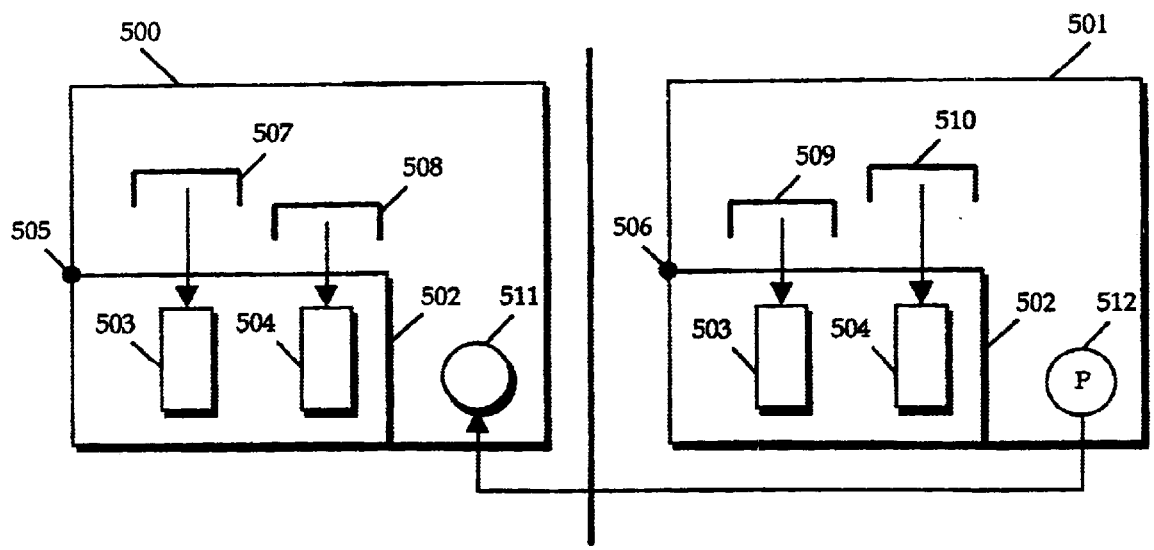
FIG. 5 is a block diagram illustrating the sharing of objects in shared memory in accordance with an embodiment of the invention.

FIGS. 4 and 5 are block diagrams illustrating one or more process spaces containing one or more shared objects in accordance with an embodiment of the invention. FIG. 4 illustrates the relationship between the shared object, comprising the shell object and shared object state, and shared memory in terms of a single process space. FIG. 5 illustrates how object state for shared objects exists within multiple process spaces in accordance with the invention, and further how process-specific shell objects provide access to the shared object state via process-specific pointers.

In FIG. 4, a shared memory block 401 is included within process space 400, beginning at shared memory base address 404. Shared object state 402 exists as a block of data within shared memory 401 at data block address 405. Offset 406 exists between shared memory base address 404 and data block address 405. Shell object 403 is instantiated within process space 400 to provide all interfaces of the shared object to the current process. Shell object 403 contains pointer 407 to shared object state 402 within process space 400. The value of pointer 407 is equal to data block address 405.

Other processes may access shared object state 402 in shared memory 401 using their own shell objects. However, within the process space of other processes, shared memory base address 404 will differ, as will data block address 405. For this reason, objects and shared memory are tracked by the peer ownership manager according to the offset value 406 between the shared memory base address 404 and the data block address 405. Offset 406 does not change regardless of process space.

Shell object 403 is implemented as a standard OLE/COM object whose reference count is incremented and decremented by its source process. The reference count of shared object state 402 is incremented for each shell object that is created to access the shared object state. When a shell object is terminated, the reference count of shared object state 402 is decremented. Thus, when all shells have terminated, shared object state 402 may be freed, allowing for reallocation of the data block within shared memory. Process shutdown order is not a problem because any existing shell object can maintain shared object state 402.

FIG. 5 illustrates object sharing between two processes within respective process spaces 500 and 501. Both process spaces include shared memory 502 containing shared object state 503 and shared object state 504. A unique GID is assigned to each shared object state. Shared memory base address 505 refers to the logical address of shared memory block 502 within process space 500, whereas shared memory base address 506 refers to the logical address of shared memory block 502 within process space 501.

Within process space 500, shell object 507 contains a pointer to shared object state 503, and provides all desired interfaces to the process in process space 500. Similarly, shell object 508 contains a pointer to shared object state 504, and provides all desired interfaces to the process in process space 500. The pointer values for shell objects 507 and 508 consist of the sum of shared memory base address 505 and the offset values for shared object state 503 and shared object state 504, respectively.

Objects from a standard OLE/COM object server may be used in conjunction with objects created by the peer ownership manager. Those objects created by the standard OLE/COM object server, referred to as "nonpeer" objects, do not have the performance advantages provided under peer ownership, and remain subject to shutdown problems. In FIG. 5, Non-peer object 511 represents an object created by a standard OLE/COM object server, such as in a dynamic linked library appended to process space 500. Non-peer object 511 is instantiated within process space 500, but does not reside within shared memory 502.

Within process space 501, shell object 509 contains a pointer to shared object state 503, providing all respective interfaces to the process in process space 501. Shell object 510 contains a pointer to shared object state 504, providing all respective interfaces to the process in process space 501. To access the interfaces of non-peer object 511 from process space 501, proxy object 512 is provided in process space 501 to marshal cross-process calls to non-peer object 511. Stub code (not shown) in process 500 serves to unmarshal the cross-process calls as previously described with respect to the standard OLE/COM mechanism.

Embodiments of methods for handling creation and management of shared objects in accordance with the invention are described below with reference to FIGS. 6 and 7. These methods access the global and process specific mapping tables maintained by the peer ownership manager. In one embodiment of the invention, these methods are implemented as functions of the peer ownership manager which may be called by the overlying processes or by other functions within the peer ownership manager.

Figure 6:
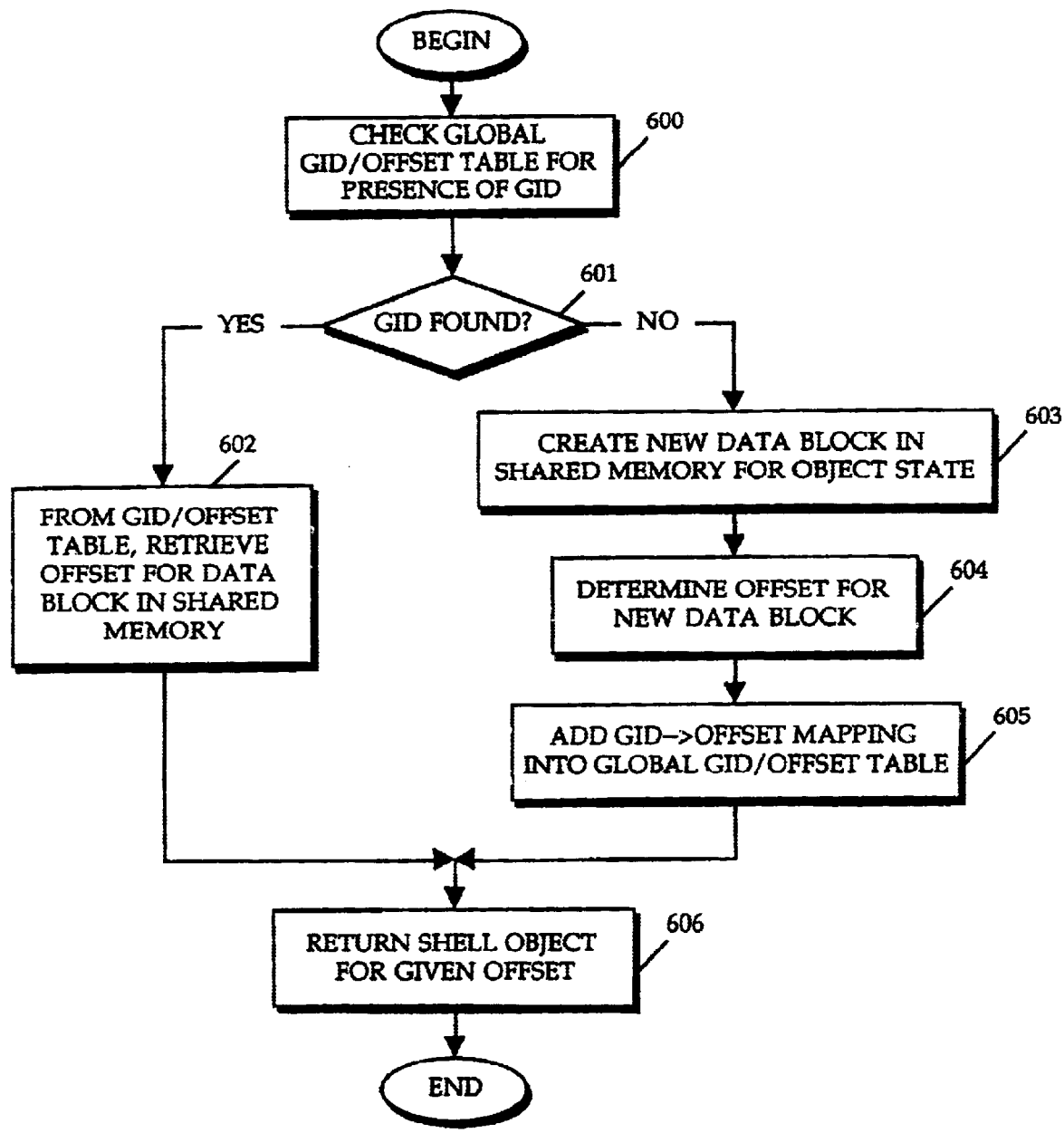
FIG. 6 is a flow diagram illustrating a method for providing a shell object corresponding to a specified global identifier in accordance with an embodiment of the invention.

FIG. 6 is a flow diagram for providing a shell object to a client process given a global identifier (GID) of a desired shared object. In step 600, the global identifier for the desired shared object is used as a reference into the global GID/offset table. If the global identifier is present within the global GID/offset table, in step 601, the method branches to step 602 where the offset associated with the global identifier in the GID/offset table is retrieved. This offset identifies the location of the data block in shared memory containing desired object's state.

If, at step 601, the global identifier is not found in the global GID/offset table, the method branches to step 603, in which a new data block is created in shared memory for the state of the desired object. After creation of the new data block, in step 604, the offset between the starting address for the data block and the base address for shared memory is determined. In subsequent step 605, the global identifier and associated offset are added to the global GID/offset table for future reference. Steps 602 and 605 each proceed to step 606 in which, given the offset for the data block in shared memory, the method returns a suitable shell object with a pointer to the: object's data block in the process space of the requesting process.

Figure 7:
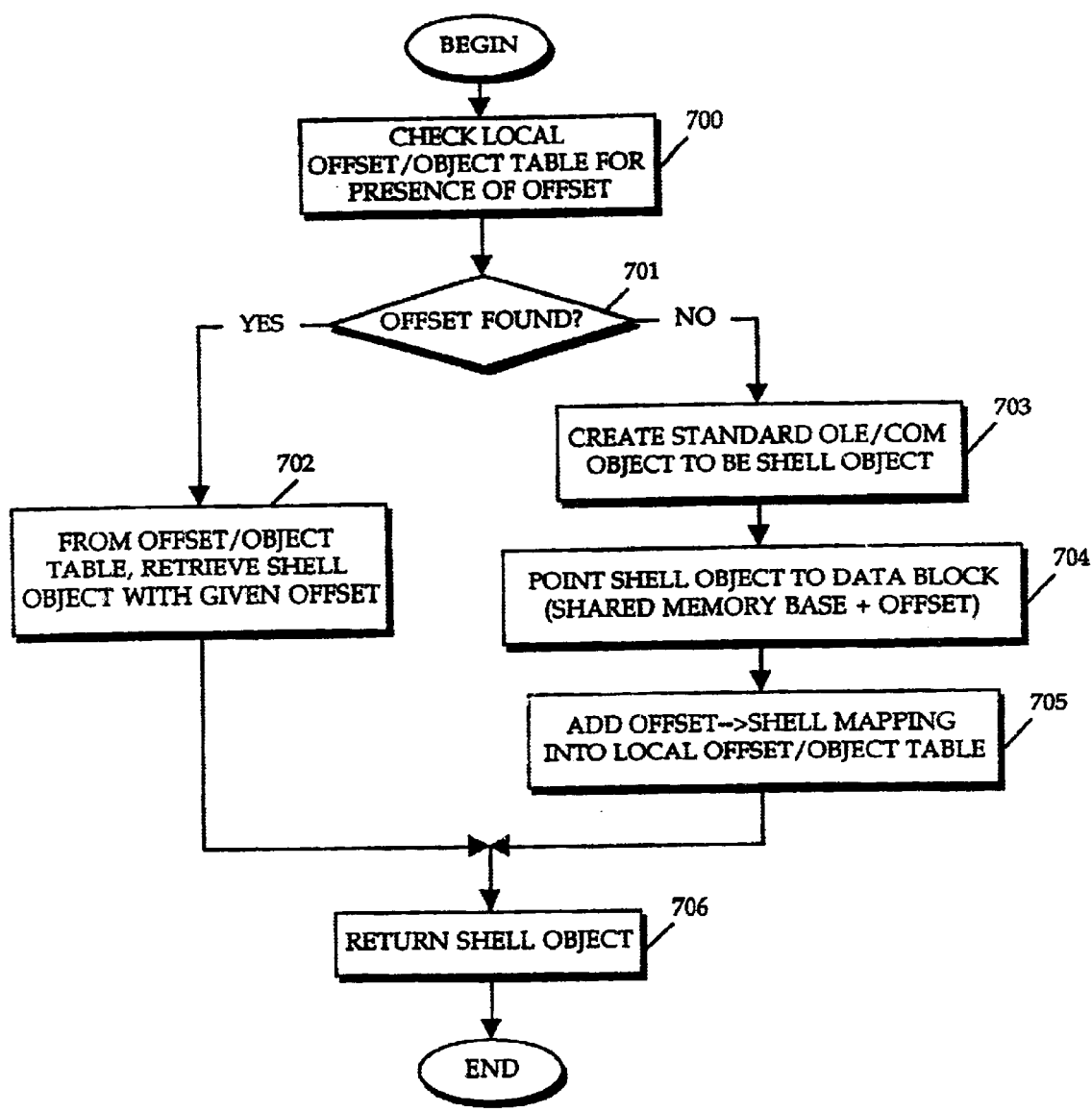
FIG. 7 is a flow diagram illustrating a method for providing a shell object corresponding to a specified shared memory offset in accordance with an embodiment of the invention.

FIG. 7 illustrates in further detail a method for providing a suitable shell object given an offset for a data block in shared memory, such as in step 606 of FIG. 6. The method of FIG. 7 begins in step 700 where the given offset value is used as a reference into the local offset/object table for the current process. If, in step 701, the offset value is present within the offset/object table, the method branches to step 702. In step 702, the desired shell object is retrieved from the local offset/object table based on the offset reference. The shell object is then returned to the requesting process in step 706.

If, in step 701, the offset value is not found within the local offset/object table, meaning that a shell object does not yet exist for the given offset in the respective process, the method branches to step 703. In step 703, the shell object is created as a standard OLE/COM object. In subsequent step 704, the newly created shell object is pointed to the object data block. The pointer value is determined for the current process space by adding the given offset value to the base address for the shared memory in the current process space. Aside from a reference count value and the pointer to the data block in shared memory, the shell object does not need to contain any further object state. In step 705, the offset and the shell object are placed into the local offset/object table maintained for the current process. In step 706, the created shell object is returned to the requesting process.

Figure 8:
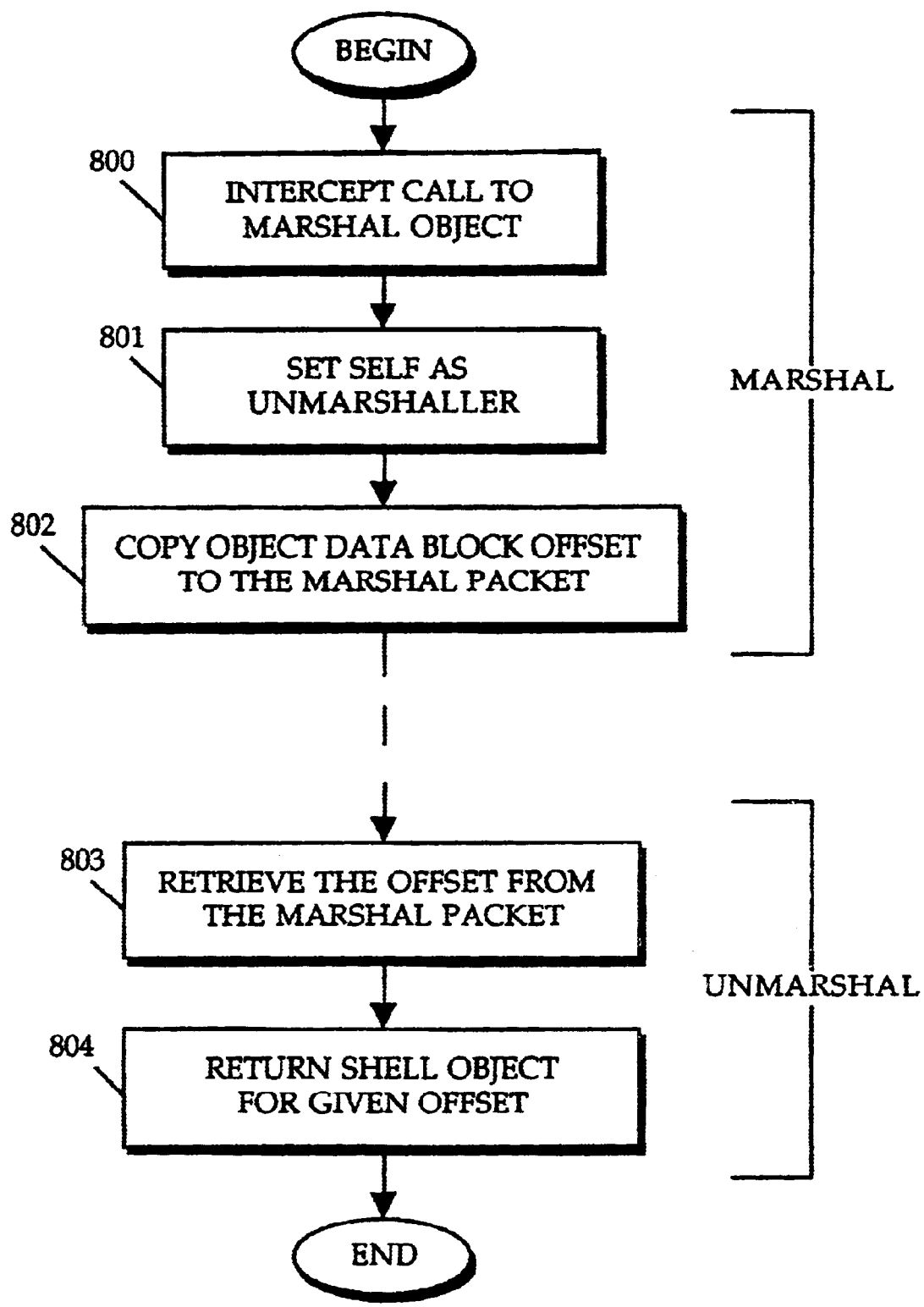
FIG. 8 is a flow diagram illustrating a marshalling and unmarshalling process in accordance with an embodiment of the invention.

FIG. 8 illustrates a method for marshalling a peer object from a first process to a second process in accordance with the invention. Whereas in the prior art, the marshalling of an object from one process to another would entail the generation of a proxy object in the requesting process which refers back to the object within the source process, the method of FIG. 8 passes the offset for the object's location in shared memory, and generates a shell in the process space of the destination process for accessing the object in shared memory. To perform this method, custom marshalling is implemented and the standard OLE/COM marshaller is circumvented.

In step 800, the peer ownership manager intercepts the call to marshal a shared object, for example, by implementing the IMarshal COM interface. In step 801, the peer ownership manager assigns itself as the unmarshaller of this call so that the OLE/COM subsystem will call the peer ownership manager when unmarshalling is needed in the destination process. In step 802, the offset corresponding to the shared object's data block location in shared memory is copied to a marshal packet. The marshal packet may be in one of the known LRPC or RPC marshalling formats.

With the marshalling steps of 800–802 complete, unmarshalling of the packet is performed in the destination process by calling the peer ownership manager to unmarshal the packet. In step 803, the data block offset value is retrieved from the marshal packet by the peer ownership manager. In step 804, the peer ownership manager returns a shell object for the given offset, for instance by applying the method of FIG. 7. The destination process is thus able to access the desired object state in shared memory via the interfaces provided by the shell object.

Object Webs and Dynamically Sized Data

Figure 9:
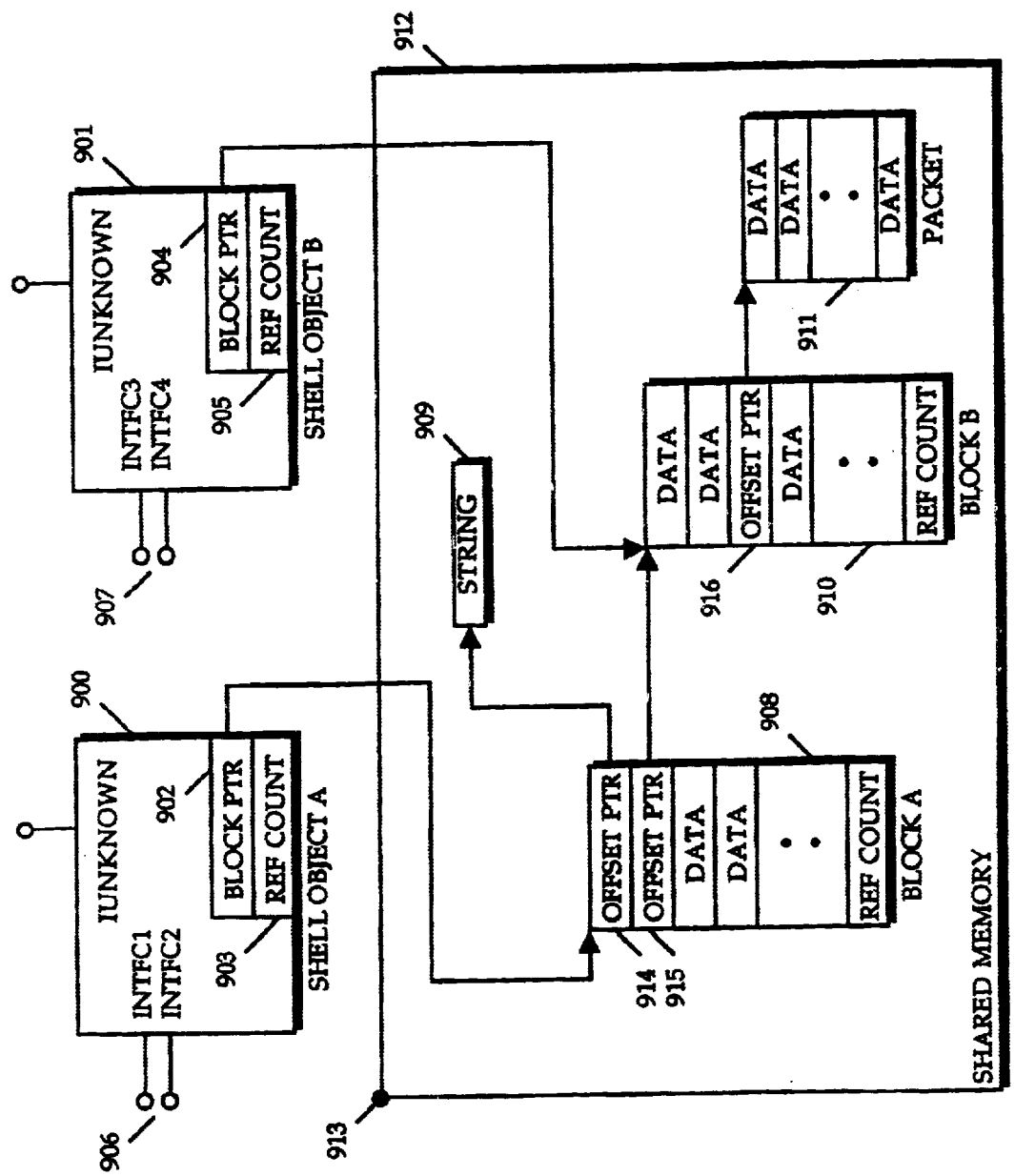
FIG. 9 is a detailed block diagram of an embodiment of shell objects with corresponding object data stored in shared memory in accordance with an embodiment of the invention.

It is often the case that one object refers to another object which may in turn refer to further objects. This arrangement of multiple objects connected by reference is referred to as an object web. For example, functions may be implemented which "get" objects from or "put" objects into another object. Nesting in this fashion can create complicated object webs. An embodiment of the present invention supports such object webs, including references to standard non-peer objects. Also, indirect storage of dynamically sized data, such as string data, is also supported. FIG. 9 is a block diagram illustrating examples of the different data types which may be stored in a shared object in accordance with the invention.

In FIG. 9, a block of shared memory 912 is located within a process space at shared memory base address 913. Residing within shared memory block 912 are: data block A, containing object state 908; string data 909; data block B, containing object state 910; and marshal packet 911, containing connection data for a standard non-peer OLE object. Object state 908 comprises offset pointers 914 and 915 referring to string data 909 and data block B, respectively. Object state 910 comprises offset pointer 916 referring to packet 911. The offset pointers represent offset values for locations in shared memory with respect to shared memory base address 913. When an offset pointer is used to access the referenced data, the offset pointer is resolved into a local pointer in the process space of the requesting process.

Shell objects 900 and 901 are instantiated within a process space, and refer to object state 908 and object state 910, respectively. Per OLE/COM standards, each shell object implements the IUnknown interface which provides information regarding the other interfaces supported by the shell objects. In addition, shell object 900 provides interfaces 906 (INTFC1 and INTFC2), and shell object 901 provides interfaces 907 (INFC3 and INTFC4). Block pointer 902 in shell object 900 points to data block A for object state 908. Block pointer 904 in shell object 901 points to data block B for object state 910. Shell objects 900 and 901 also maintain reference counts 903 and 905, respectively. Note that reference counts 903 and 905 are for shell objects 900 and 901, and not for object states 908 and 910, which maintain their own respective reference counts.

If shell object 900 desires to access string data 909, offset pointer 914 is resolved into a local pointer to access the string data. If shell object 900 desires to access the shared object represented by offset pointer 915, rather than resolving the offset pointer into a local pointer, the offset is used to obtain the corresponding shell object (e.g., using the method of FIG. 7). In this instance, shell object 901 is returned. If shell object 901 wishes to access the non-peer object represented by offset pointer 916; the offset pointer is resolved into a local pointer, and the packet is unmarshalled using the standard OLE/COM unmarshaller. The unmarshalling of the packet using the standard OLE/COM unmarshaller results in the creation of a proxy object for accessing the original non-peer object from which the packet was marshalled. These data handling processes are more fully described below with respect to the flow diagram of FIGS. 10A and 10B.

Figure 10A:
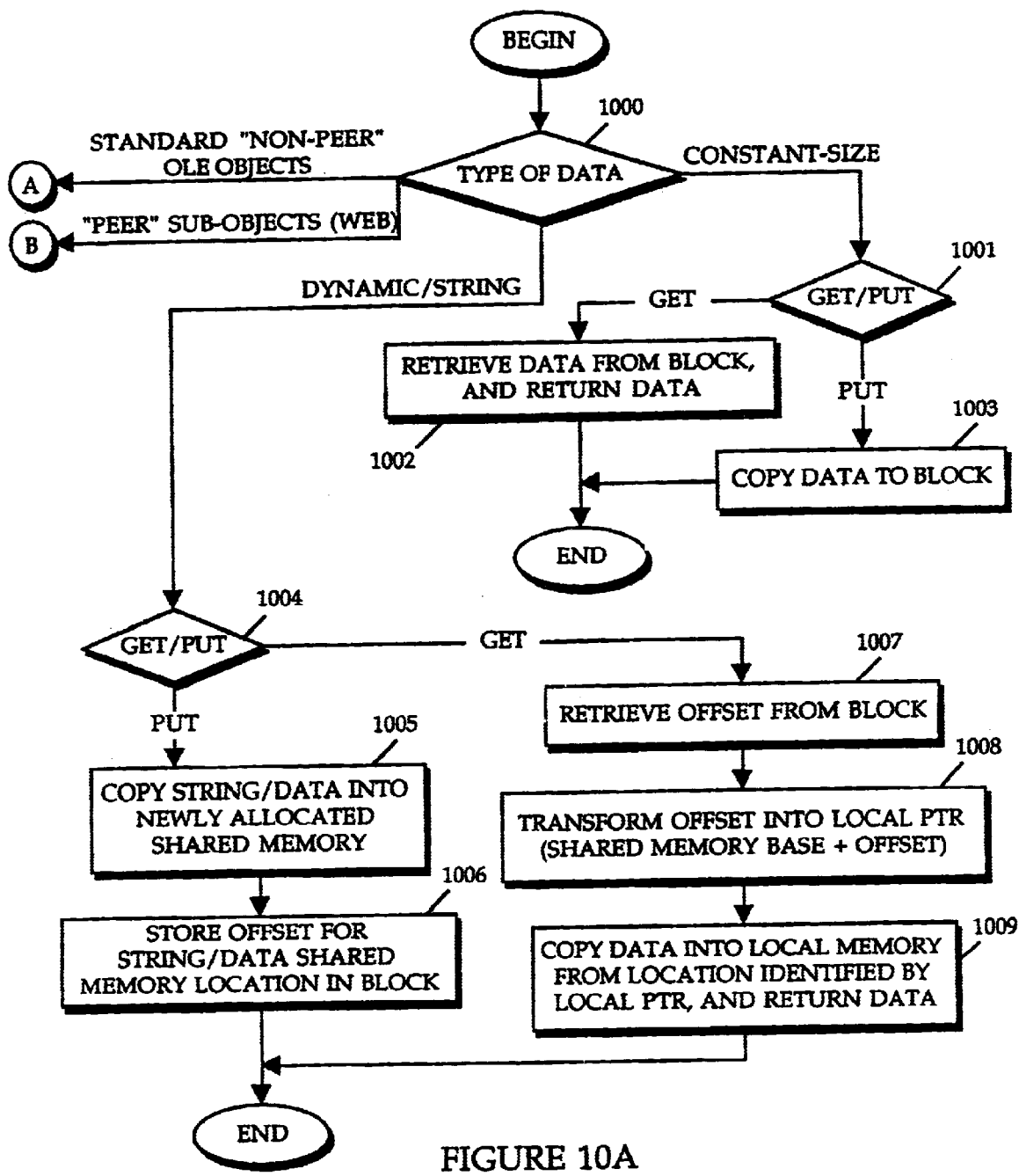
FIGS. 10A–B are a flow diagram illustrating a method for handling data transfer functions invoked on a shared object in accordance with an embodiment of the invention.
Figure 10B:
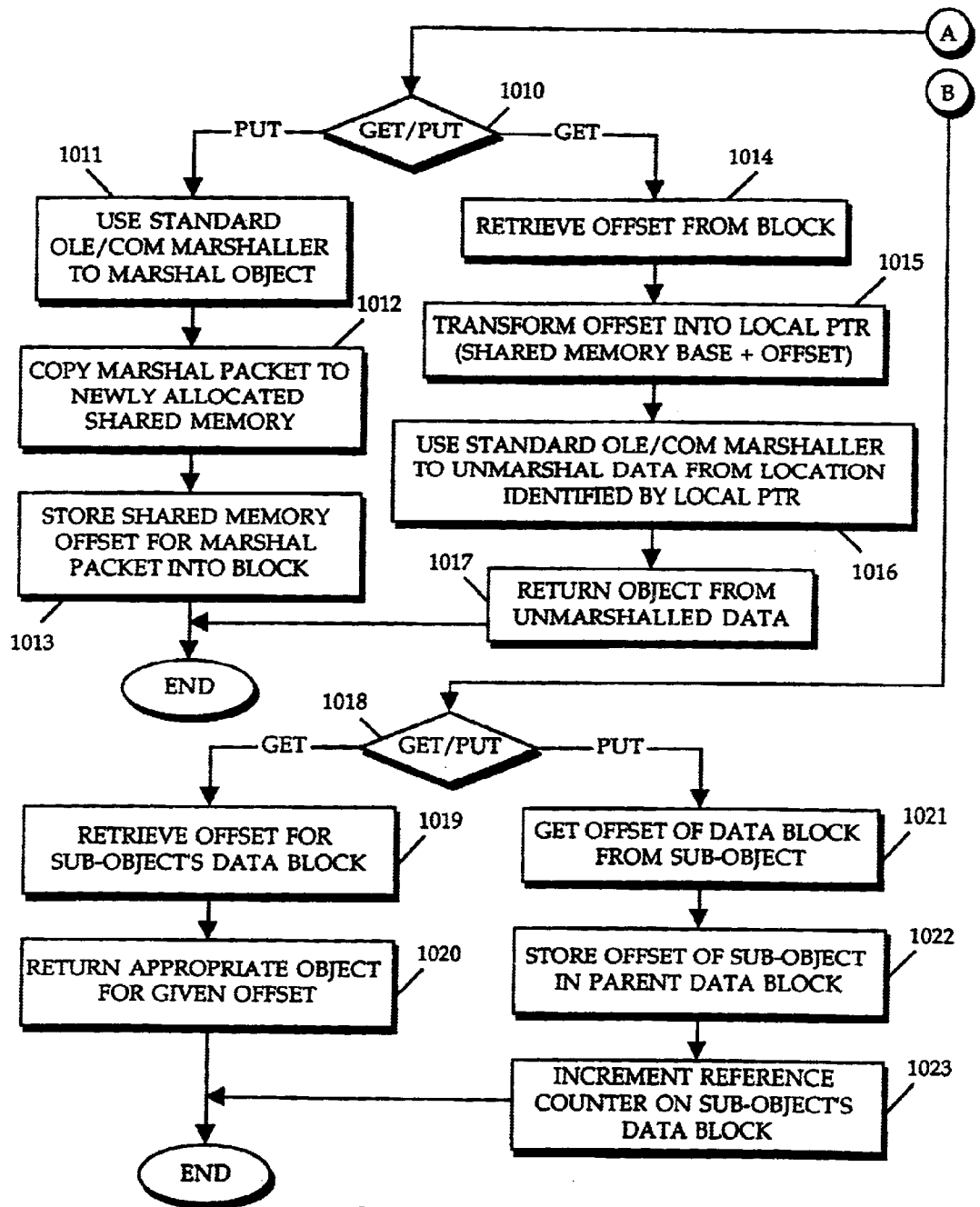

FIGS. 10A and 10B illustrate a method for managing the transfer of data in and out of shared objects in terms of "put" and "get" functions for different types of data A "put" function in this instance refers to a function which places data into a shared object. A "get" function refers to a function which retrieves data of the designated type from a shared object. In one embodiment, the peer ownership manager carries out the steps of FIGS. 10A–10B that are necessary to resolve offset pointers for a given process space. Some or all of the steps may also be carried out by the shell objects in the implementation of their respective interfaces. The transfer of standard non-peer OLE objects not created by the peer ownership manager is supported with the assistance of the standard OLE/COM marshaller.

In step 1000 of FIG. 10A, a branching occurs based on the type of data being transferred. For data types of constant size, the method proceeds to step 1001; for dynamically sized data or string data, the method proceeds to step 1004; for standard non-peer OLE objects generated by a standard object server, the method proceeds to step 1010; and, for sub-objects of an object web, the method proceeds to step 1018.

In step 1001, a further branching occurs based on whether the transfer is a "get" function or a "put" function. For "get" functions, in step 1002, the targeted data is retrieved from the object data block in shared memory using the local pointer within the shell object, and the data is returned by the function. For "put" functions, in step 1003, using the local pointer within the shell object, the designated data is copied to the object data block in shared memory.

For dynamic or string data, a branching occurs at step 1004 based on whether the transfer function is a "get" function or a "put" function. For a "put" function, in step 1005, the designated string or other dynamic data is copied into a newly allocated portion of shared memory. The shared memory offset for the location of the string or other dynamic data is stored in the object data block of shared memory, in step 1006. For a "get" function, in step 1007, the shared memory offset value corresponding to the target data is retrieved from the object data block in shared memory. In steps 1008, the shared memory offset of the target data is transformed into a local pointer by adding the shared memory base for the current process space. In step 1009, the local pointer determined in step 1008 is used to identify the location in shared memory of the target data. The target data is copied from shared memory into local memory and returned in step 1009.

For standard "non-peer" OLE objects, not created by the peer ownership manager, a branching occurs at step 1010 based on whether the function is a "get" function or a "put" function. For a "put" function, in step 1011, the standard OLE/COM marshaller is used to marshal the target object into a marshal packet. This typically means that a reference to appropriate stub code, or other information required to link a proxy object to the target object, is inserted into the packet. In step 1012, the marshal packet is copied into a newly allocated portion of shared memory. In step 1013, the corresponding shared memory offset for the location of the stored marshal packet is placed into the object data block in shared memory.

For a "get" function, i.e., a function to retrieve a standard non-peer OLE object from another object in shared memory, in step 1014, the offset associated with the location of the marshal packet in shared memory is retrieved from the object data block. In step 1015, the offset is transformed into a local pointer by adding the shared memory base address for the current process space. In step 1016, the standard OLE/COM marshaller is used to unmarshal the data from the marshal packet at the location specified by the local pointer. In step 1017, the unmarshalled information is used to create a proxy object and link it to the stub code of the non-peer object. This proxy object is returned by the function.

For "peer" sub-objects. of an object web, a branch occurs at step 1018 based on whether the function call is directed to "get" a sub-object from the object web, or to "put" a sub-object into an object web. If the function call is a "put" function directed to placing a sub-object into an existing object web, in step 1021, the shared memory offset for the location of the sub-object's data block in shared memory is retrieved from the sub-object. In step 1022, the shared memory offset for the. sub-object is stored into the parent object's data block in shared memory. In step 1023, the reference counter for the sub-object's data block is incremented to reflect the reference maintained on the sub-object by the parent object. Thus, the parent object keeps the sub-object's data block alive. If the current sub-object replaces a previous sub-object, the reference count of the previous sub-object is decremented.

If the function call is directed to getting a sub-object from the object web, in step 1019, the shared memory offset for the sub-object's data block in shared memory is retrieved from the parent object's data block. In step 1020, the sub-object's offset is used to return an object shell to access the desired sub-object, for instance by, applying the method of FIG. 7.

It will be obvious to one skilled in the art that these methods may be applied to other shared object schemes, such as SOM (System Object Model) and CORBA (Common Object Request Broker Architecture). Further, standard C++ objects may be shared using the methods of the invention independent of any shared object scheme. Aspects such as marshalling of data would be handled by the peer ownership manager which may be implemented as a stand-alone API.

Thus, a method and apparatus for providing peer ownership of shared objects has been described. Particular embodiments described herein are illustrative only and should not limit the present invention thereby. The invention is defined by the claims and their full scope of equivalents.

What is claimed is:

1. A method for providing peer ownership of shared objects by multiple processes, comprising:
    creating a first shell object associated with a first process, wherein the first shell object includes a reference to a first shared object state stored in shared memory;
    creating a second shell object associated with the first process to access a second shared object state when the first shell object desires to access the second shared object state, wherein the second shell object includes a reference to the second object state stored in the shared memory;
    creating a third shell object associated with a second process, wherein the third shell object includes a reference to the first shared object state stored in the shared memory so that the first and second processes are peer owners of the first shared object state;
    creating a fourth shell object associated with the second process to access the second shared object state when the third shell object desires to access the second shared object state, wherein the fourth shell object includes a reference to the second shared object state stored in the shared memory so that the first and second processes are peer owners of the second shared object state;
    determining a first offset value corresponding to a global identifier of the first object state, the first offset value associated with a first data block in the shared memory, the first data block including the first shared object state, wherein the first shell object includes a pointer to the first data block in a process space of the first process;
    determining if the first offset value is present in a second table, the second table comprising a plurality of shell objects for the first process, the plurality of shell objects referenced by a plurality of offset values;
    if the first offset value is present in the second table, creating the first shell object further comprises:
        retrieving from the second table the first shell object corresponding to the first offset value; and
    if the first offset value is not present in the second table, creating the first shell object further comprises:
        creating the first shell object in the process space;
        setting the pointer in the first shell object to point to the first data block; and
        adding the first shell object and the first offset value to the second table.

2. The method of claim 1, wherein determining the first offset value corresponding to the global identifier comprises:
    determining if the global identifier is present in a first table, the first table comprising a plurality of associated offset values referenced by a plurality of global identifiers;
    if the global identifier is present in the first table,
        retrieving from the first table the first offset value corresponding to the global identifier of the object;
    if the global identifier of the object is not present in the first table,
        creating the first data block in shared memory to contain the first shared object state of the object;
        determining the first offset value for the first data block; and
        adding the global identifier and the first offset value to the first table.

3. The method of claim 2, wherein determining the first offset value for the first data block comprises determining a distance between a data block address of the first data block in shared memory and a base address of the shared memory.

4. The method of claim 1, wherein setting the pointer comprises adding the first offset value to a base address of the shared memory in the process space.

5. The method of claim 1, wherein the first shared object state is part of a first data block, the method further comprising:
    maintaining a first reference count for the first shell object; and
    maintaining a second reference count for the first data block.

6. The method of claim 5, wherein creating the first shell object further comprising:
    returning the first shell object to the first process;
    wherein maintaining the first reference count comprises:
        incrementing the first reference count when the first shell object is returned to the first process; and
        decrementing the first reference count when the first process releases the first shell object.

7. The method of claim 5, wherein maintaining the second reference count comprises:
    incrementing the second reference count when the first shell object is created; and
    decrementing the second reference count when the first shell object is terminated.

8. The method of claim 1, further comprising:
    intercepting a call to marshal the first shell object state to the second process;
    copying the first offset value associated with the first shell object to a marshal packet;

retrieving the first offset value from the marshal packet; and based on the retrieved first offset value, returning a second shell object to the second process, the second shell object containing a pointer to the first data block in shared memory in a process space of the second process.

9. The method of claim 1, further comprising:

copying data into a portion of shared memory; and storing a second offset value of the portion of shared memory into the first data block as an element of the first shared object state.

10. The method of claim 9, further comprising:

retrieving the second offset value from the first data block;

transforming the second offset value into a local pointer; and returning the data from the portion of shared memory identified via the local pointer.

11. The method of claim 1, further comprising:

marshalling a non-peer object into a marshal packet;

copying the marshal packet into a portion of shared memory; and storing a second offset value of the portion of shared memory into the first data block as an element of the first shared object state.

12. The method of claim 11, further comprising:

retrieving the second offset value from the first data block;

transforming the second offset value into a local pointer; and unmarshalling the non-peer object from the portion of shared memory identified via the local pointer.

13. The method of claim 1, further comprising:

determining a second offset value associated with a second shared object state within a second data block in shared memory;

storing the second offset value into the first data block as an element of the first shared object state; and incrementing a reference count associated with the second data block.

14. The method of claim 13, further comprising:

retrieving the second offset value from the first data block; and returning a second shell object corresponding to the second offset value, the second shell object pointing to the second data block containing the second shared object state.

15. The method of claim 1, further comprising:

utilizing a peer ownership manager as an object server for the first and second shared object states.

16. A computer program product comprising:

a computer usable medium having computer program code embodied therein for providing peer ownership of shared objects by multiple processes, the computer program product comprising:

computer program code configured to create a first shell object associated with a first process, wherein the first shell object includes a reference to a first shared object state stored in shared memory;

computer program code configured to create a second shell object associated with the first process to access a second shared object state when the first shell object desires to access the second shared object state, wherein the second shell object includes a reference to the second object state stored in the shared memory;

computer program code configured to create a third shell object associated with a second process, wherein the third shell object includes a reference to the first shared object state stored in the shared memory so that the first and second processes are peer owners of the first shared object state;

computer program code configured to create a fourth shell object associated with the second process to access the second shared object state when the third shell object desires to access the second shared object state, wherein the fourth shell object includes a reference to the second shared object state stored in the shared memory so that the first and second processes are peer owners of the second shared object state computer program code configured to cause a computer to determine a first offset value corresponding to a global identifier of the first object state, the first offset value associated with a first data block in the shared memory, the first data block including the first shared object state, wherein the first shell object includes a pointer to the first data block in a process space of the first process wherein the computer program code configured to cause a computer to determine the first shell object corresponding to the first offset value comprises:

computer program code configured to cause a computer to determine if the first offset value is present in a second table, the second table comprising a plurality of shell objects for the first process referenced by a plurality of offset values;

computer program code configured to cause a computer to retrieve from the second table the first shell object corresponding to the first offset value if the first offset value is present in the second table;

computer program code configured to cause a computer to perform the following if the first offset value is not present in the second table, creating the first shell object in the process space;

setting the pointer in the first shell object to point to the first data block; and adding the first shell object and the first offset value to the second table.

17. The computer program product of claim 16, wherein the computer program code configured to cause a computer to determine the first offset value corresponding to the global identifier comprises:

computer program code configured to cause a computer to determine if the global identifier is present in a first table, the first table comprising a plurality of associated offset values referenced by a plurality of global identifiers;

computer program code configured to cause a computer to retrieve from the first table the first offset value corresponding to the global identifier of the object if the global identifier is present in the first table;

computer program code configured to cause a computer to perform the following operations if the global identifier of the object is not present in the first table:

creating the first data block in shared memory to contain the first shared object state of the object;

determining the first offset value for the first data block; and adding the global identifier and the first offset value to the first table.

18. The computer program product of claim 17, wherein the computer program code configured to cause a computer to determine the first offset value for the first data block comprises:

computer program code configured to cause a computer to determine a between a data block address of the first data block in shared memory and a base address of the shared memory.

19. The computer program product of claim 16, wherein the computer program code configured to cause a computer to set the pointer comprises:

computer program code configured to cause a computer to add the first offset value to a base address of the shared memory in the process space.

20. The computer program product of claim 16, wherein the first shared object state is part of a first data block, the computer program product further comprising:

computer program code configured to cause a computer to maintain a first reference count for the first shell object; and computer program code configured to cause a computer to maintain a second reference count for the first data block.

21. The computer program product of claim 20, wherein the computer program code configured to cause a computer to maintain the first reference count comprises:

computer program code configured to return the first shell object to the first process;

computer program code configured to cause a computer to increment the first reference count when the first shell object is returned to the first process; and computer program code configured to cause a computer to decrement the first reference count when the first process releases the first shell object.

22. The computer program product of claim 20, wherein the computer program code configured to cause a computer to maintain the second reference count comprises:

computer program code configured to cause a computer to increment the second reference count when the first shell object is created; and computer program code configured to cause a computer to decrement the second reference count when the first shell object is terminated.

23. The computer program product of claim 16, further comprising:

computer program code configured to cause a computer to intercept a call to marshal the first shell object to a second process;

computer program code configured to cause a computer to copy the first offset value associated with the first shell object to a marshal packet;

computer program code configured to cause a computer to retrieve the first offset value from the marshal packet; and computer program code configured to cause a computer to return a second shell object to the second process based on the retrieved first offset value, the second shell object containing a pointer to the first data block in shared memory in a process space of the second process.

24. The computer program product of claim 16, further comprising:

computer program code configured to cause a computer to copy data into a portion of shared memory; and computer program code configured to cause a computer to store a second offset value of the portion of shared memory into the first data block as an element of the first shared object state.

25. The computer program product of claim 24, further comprising:

computer program code configured to cause a computer to retrieve the second offset value from the first data block;

computer program code configured to cause a computer to transform the second offset value into a local pointer; and computer program code configured to cause a computer to return the data from the portion of shared memory identified via the local pointer.

26. The computer program product of claim 16, further comprising:

computer program code configured to cause a computer to marshal a non-peer object into a marshal packet;

computer program code configured to cause a computer to copy the marshal packet into a portion of shared memory; and computer program code configured to cause a computer to store a second offset value of the portion of shared memory into the first data block as an element of the first shared object state.

27. The computer program product of claim 26, further comprising:

computer program code configured to cause a computer to retrieve the second offset value from the first data block;

computer program code configured to cause a computer to transform the second offset value into a local pointer; and computer program code configured to cause a computer to unmarshal the non-peer object from the portion of shared memory identified via the local pointer.

28. The computer program product of claim 16, further comprising:

computer program code configured to cause a computer to determine a second offset value associated with a second shared object state within a second data block in shared memory;

computer program code configured to cause a computer to store the second offset value into the first data block as an element of the first shared object state; and computer program code configured to cause a computer to increment a reference count associated with the second data block.

29. The computer program product of claim 28, further comprising:

computer program code configured to cause a computer to retrieve the second offset value from the first data block; and computer program code configured to cause a computer to return a second shell object corresponding to the second offset value, the second shell object pointing to the second data block containing the second shared object state.

* * * * *